United States Patent [19]

Sallis

[11] Patent Number: 4,930,493
[45] Date of Patent: Jun. 5, 1990

[54] MULTI-LEVER RIM-DRIVE HELIOSTAT

[76] Inventor: Daniel V. Sallis, 5720 Blue Sage Dr., Littleton, Colo. 80123

[21] Appl. No.: 192,691

[22] Filed: May 9, 1988

[51] Int. Cl.$^5$ ............................ F24J 2/10; G03B 31/00
[52] U.S. Cl. ........................................ 126/438; 353/3; 350/632
[58] Field of Search ...................... 126/424, 425, 438; 136/246; 353/3; 350/632, 633

[56] References Cited

U.S. PATENT DOCUMENTS

| | | | |
|---|---|---|---|
| 4,342,501 | 8/1982 | Solomon | 350/632 |
| 4,419,981 | 12/1983 | Mori | 126/425 |
| 4,466,423 | 8/1984 | Dolan et al. | 126/424 |

FOREIGN PATENT DOCUMENTS 2535033  4/1984  France .................. 126/424

Primary Examiner—Randall L. Green
Attorney, Agent, or Firm—Charles C. Corbin

[57] ABSTRACT

Disclosed is a heliostat assembly having a circular, ring mounted reflector which is driven and supported by an arrangement of elongated levers. A pair of levers are spaced apart and pivotally mounted at their lower ends, and have upper ends which are linked to the heliostat ring at diametrically opposite horizontally spaced location, by way of ball-and-socket type joints. A third lever has a first end similarly mounted to the heliostat ring at a location below and mid-way between the connections of the lever pair. Assuming the assembly is located in a south-facing heliostat field, the third lever extends generally southward to its second end which is mounted for movement about a horizontal axis. By driving each one of the lever pair in opposite directions the heliostat may be turned for solar tracking. The heliostat may also be driven to a protective stow position by pivoting the lever pair southwardly together in parallel, until the heliostat is turned to a horizontal, face-down position.

13 Claims, 4 Drawing Sheets

MULTI-LEVER RIM-DRIVE HELIOSTAT

BACKGROUND

1. Field of the Invention

This invention relates generally to heliostats that are useful for concentrating reflected solar energy upon a remote absorber, and more particularly a rim supported heliostat that may be turned to a face-down stow position.

2. Description of Prior Art

Conventional solar thermal power systems employ arrays of individually steered reflectors or heliostats and a tower-mounted central receiver. In a megawatt sized system of commercial import a field may include hundreds or even thousands of heliostats. Such an array comprises a heliostat field which redirects radiant solar energy to the receiver. The individual heliostat in such a field has typically comprised silver backed glass mirrors supported on a steel frame which is connected to a two-axis tracking drive system and mounted to a pedestal anchored in reinforced concrete. These glass/metal heliostat assemblies are expensive. They are also relatively massive and involve structures such as beams and trusses which represent a significant amount of material in bending—which is not very efficient structurally. Since the heliostat field represents a significant part of the system investment, a lighter, less expensive, and more efficient heliostat assembly would bring a significant improvement in cost effectiveness and will help solar thermal systems become truly viable.

The recent development of stretched membrane heliostats, in which a sheet material such as thin gauge metal is supported in tension upon a rigid frame, has provided heliostats that are light-weight and less expensive. However, the benefits of the stretched membrane concept cannot be beneficially incorporated into a system until a complementary, efficient and effective assembly for mounting and driving this type of heliostat is provided.

Another concern in conventional central receiver systems is the need to keep the heliostat reflective surfaces clean and to protect them from the effects of adverse weather conditions such as hail, rain and windstorms. Where expensive reflective coatings are used the concern is even greater. Again, given the large numbers of heliostats in a field, this is a significant concern.

SUMMARY OF THE INVENTION

In view of the foregoing, it is an object of the present invention to provide a heliostat assembly which is relatively light-weight and inexpensive.

Another object of the invention is to provide a heliostat assembly which can efficiently and effectively mount a stretched membrane heliostat for tracking.

A further object is to provide a heliostat assembly by which a heliostat may be easily turned to a face-down protective position as required.

The foregoing and further objects and advantages are attained by the present invention that provides a heliostat which is supported by pivotable levers which link to the heliostat at points along its rim. The invention features first and second main levers which are pivotally mounted at their lower ends via ball-and-socket type joints at horizontally spaced apart locations. The upper ends of the main levers are linked to the rim of the heliostat at diametrically spaced apart locations where they form ball-and-socket type joints. There is a third, central lever which has a first end which links to the heliostat rim at a point equidistant from the two other joints. This is also a ball-and-socket type joint. The other end of the central lever is mounted at a location equidistant from the lower ends of the main levers, and this mounting permits the central lever to turn only about a horizontal axis.

The invention includes means for driving each of the main levers in pivotal motion whereby moving the main levers in opposite directions will vary the azimuth of the heliostat by turning it about an axis through the joint of the central lever and heliostat rim. Relative movement of the main levers in the same direction controls heliostat elevation. The assembly of the invention also allows the heliostat to be turned to a horizontal inverted position for stowing.

It is noteworthy that the lever linked heliostat of the invention is driven and supported along its rim, which arrangement carries loads directly to the ground in a structurally efficient manner.

Additional advantages and novel features of the present invention will be apparent to those skilled in the art upon examination of the following description and claims.

BRIEF DESCRIPTION OF THE DRAWINGS

FIG. 3 is a perspective view illustrating a plurality of the inventive heliostats driven by cables;

DETAILED DESCRIPTION

Figure 1:
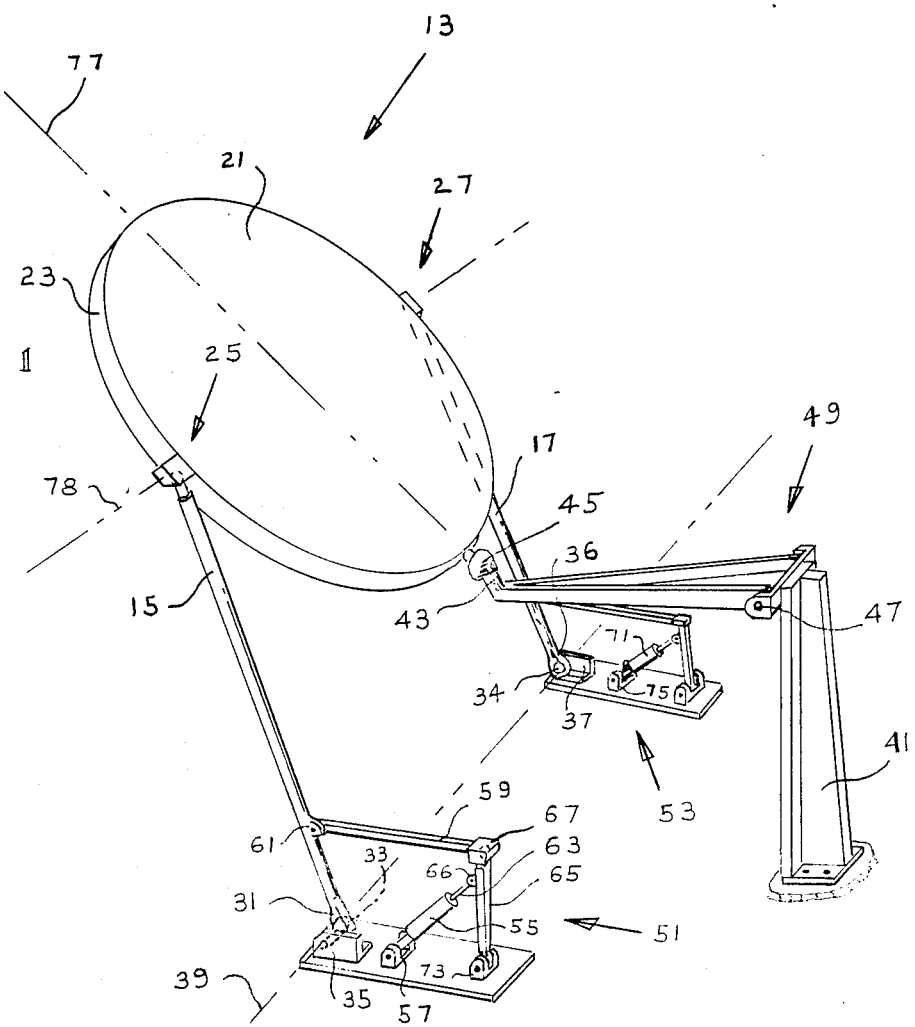
FIG. 1 is a view in perspective showing the heliostat assembly of the invention.

A first embodiment of the invention is shown in FIG. 1. Here it is seen that the main components of the invention comprise a heliostat 13, which is supported by a first and second main levers 15 and 17 respectively, and a central arm 19. Heliostat 13 is preferably of the stretched membrane type and includes a membrane in tension supporting a reflective surface 21, and a metal support ring 23. One such heliostat design is disclosed in U.S. Pat. No. 4,620,382. While this design is preferred, it should be understood however that the present invention is not necessarily limited to use with lightweight type heliostats. The inventive concepts set forth herein can be readily adapted to employ other types of heliostats, as well as dish type concentrator modules, and in general solar collectors that must be mounted in a solar tracking mode, as those skilled in the art will recognize in light of the present disclosure.

It is seen in FIG. 1 that the upper end of the first lever 15 is linked to support ring 23 by way of a conventional ball-and-socket type joint indicated by reference numeral 25, with the ball component carried by the bar 15. Diametrically opposite the joint 25 is located a similar ball-and-socket joint 27 by which the top of the second lever 17 is linked to support ring 23. For the purposes of establishing a directional reference it is assumed that the assembly shown in FIG. 1 is located amongst a south-facing field of heliostats, and northward of a central receiver. FIG. 1 also shows that the lower ends of first lever 15 and second lever 17 are respectively mounted by way of linkages which permit pivoting freedom in all directions, including rotational freedom about the longitudinal axes of the levers, in the manner of ball-and-socket joints. Thus the lower end of first lever 15 provides a socket structure 31 which mounts to first ball 33 carried by bracket 35. The lower end of second lever 17 is similarly constructed to that of first lever 15 and has second socket structure 36 which mounts to second ball 34 carried by second bracket 37. The first and second balls 33 and 34 are aligned about the generally east-west extending axis denoted by reference numeral 39.

There is an upright support column 41, comprising a steel column having a bottom end which is located southward and midway of the lower ends of main levers 15 and 17, and is bolted to a concrete footing. It will be appreciated that the light-weight and efficient construction allowed by the invention also allows the aforementioned concrete footings to be of modest proportions when compared to the foundations required by conventional pedestal supported designs.

The northward end of central arm 19 has an upward extension 43 which terminates in the socket portion of a ball-and-socket joint 45 on support ring 23. This joint 45 is located at a point on the support ring 23 which is equidistant from the joints 27 and 25. The southward end of arm 19 is pivotally attached to the top of post 41 by a conventional hinge-type joint 49, for rotation about a horizontal axis through pin 47. Thus the central arm 19 is confined for motion within a vertical plane therethrough, and holds the lower end of heliostat 13, at the joint 45, against any east-west motion. The joint 49 is equidistant from the lower ends of levers 15 and 17.

Figure 2:
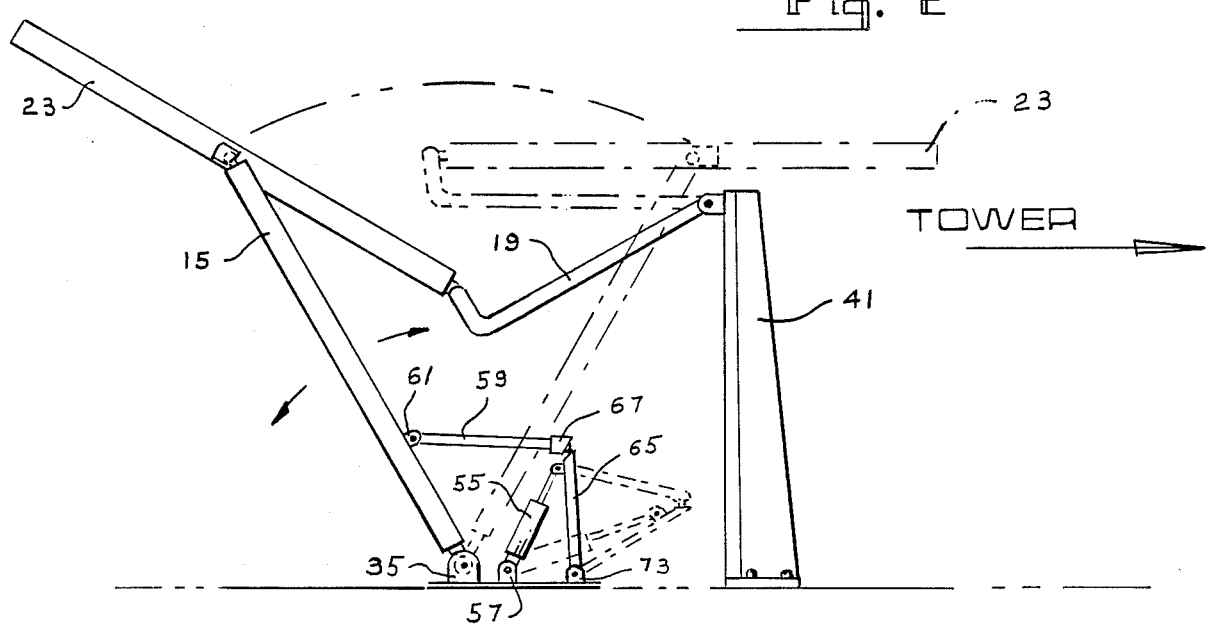
FIG. 2 is a side elevational view illustrating a heliostat position for tracking, and in phantom, a stow position.

In order to drive the main levers 15 and 17, the hydraulic drive mechanisms 51 and 53 respectively are provided. FIG. 2 shows that mechanism 51 has a first linking arm 59 which is pivotally mounted at bracket 61, and which forms a ball-and-socket joint 67 with the upper end of a second linking arm 65 at which provides the ball component of the joint. A bracket 73 mounts the lower end of arm 65 for rotation about a generally horizontal axis which is parallel to the general east-west axis 39. The lower end of a first hydraulic cylinder 55 is pivotally mounted in a bracket 57 for rotation about an axis which is also parallel to axis 39. The cylinder rod 63 pivotally links with linking arm 65 at bracket 66. The construction of drive mechanism 53 corresponds to that of drive mechanism 51, and includes cylinder 71 and a bracket 75.

With heliostat 13 supported in a tracking configuration as illustrated in FIG. 1, differential pivoting of levers 15 and 17 will provide azimuth control. This will tend to turn heliostat 13 about the tilted axis indicated by reference numeral 77, which axis passes through the joint 45 and bisects the heliostat.

For elevation control the levers 15 and 17 are movable in the same direction. Thus the axis 77 may be elevated or lowered, and heliostat 13 will be rotated about the axis 78 which passes through the joints 25 and 27. It will be appreciated by those having skill in the art that other drive means, such as a screw drive, may be suitably employed to drive the main lever arms 15 and 17.

The cylinders 55 and 71 are connected to a hydraulic drive system which interfaces with a conventional heliostat control system (under the control of software direction well known in the heliostat control art). When the invention is operating in a heliostat field of a thermal central receiver power system, the heliostat 13 must be steered so as to constantly project the image of the sun upon the central receiver throughout the day. This is achieved when the aforementioned control system provides the hydraulic drive system with command signals to effect the necessary precise differential and unidirectional movement of levers 15 and 17.

It is noted that there normally will be little variation in the elevation of the center-of-gravity of the heliostat 13 during tracking motion. In the preferred embodiment this fact is used advantageously to minimize power consumption by hydraulically interconnecting the cylinders 55 and 71 so as to balance most of the lever turning forces. This feature also permits the levers to be efficiently driven when the heliostat is experiencing wind loads.

In order to protect the reflective surface 21 from adverse weather conditions, and to stow the heliostat 13 during night time, the unique heliostat rim linkages of the invention allow the levers 15 and 17 to be fully moved southward in unison to tilt the heliostat 13 to the inverted, horizontal position shown in FIG. 2. The heliostat may be easily and quickly moved to and from this position as required.

Figure 5:
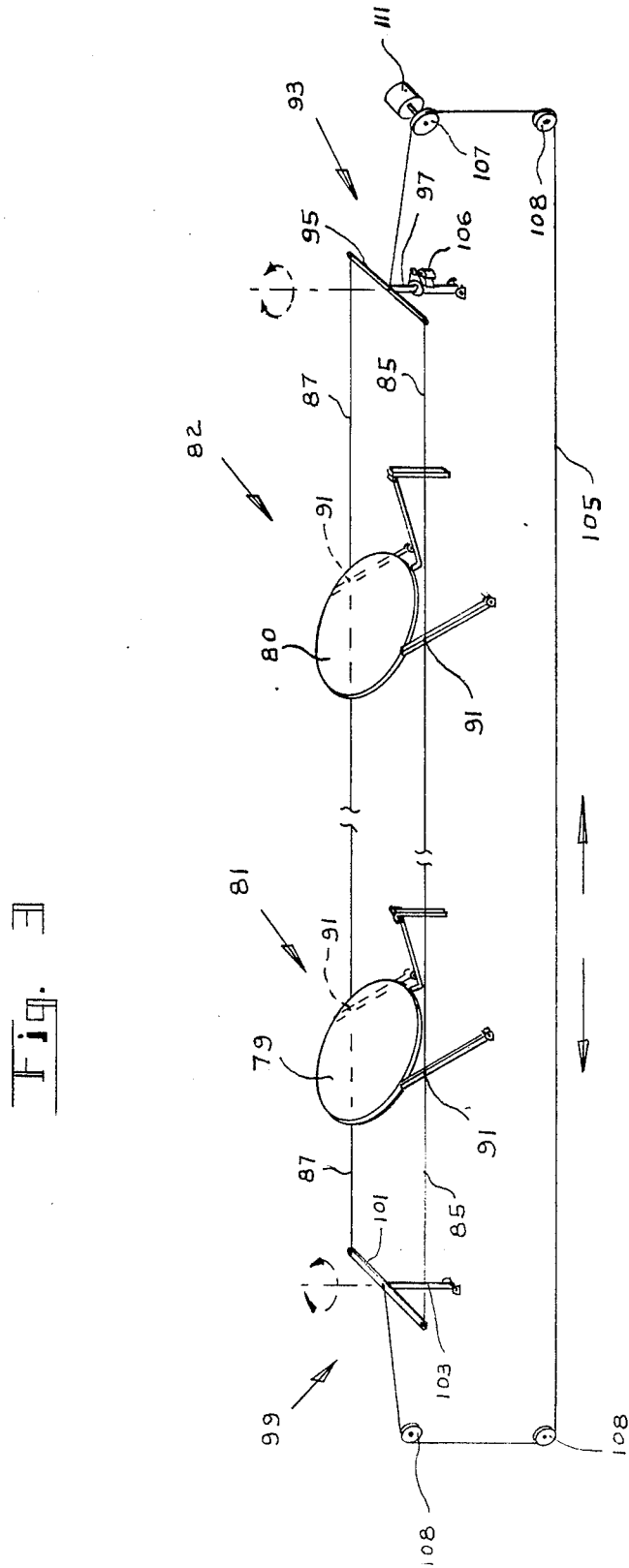
FIG. 5 is a side elevational view illustrating the stow position of the assembly of FIG. 4.
Figure 4:
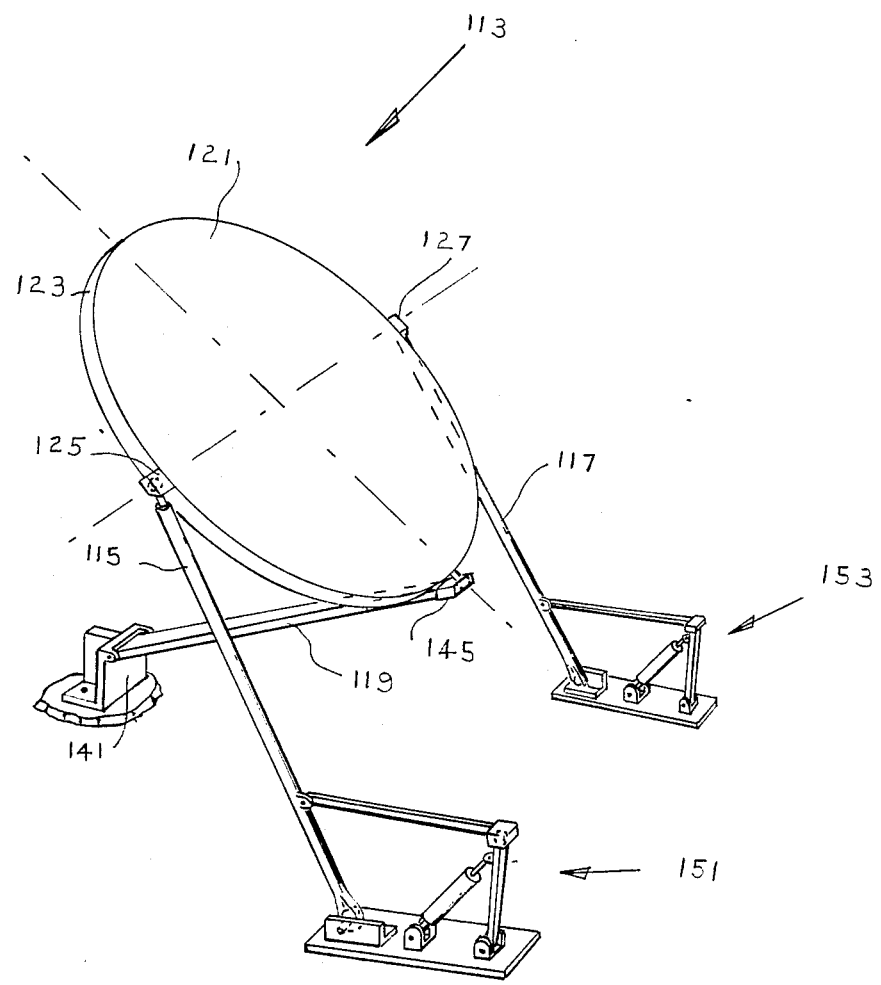
FIG. 4 is a view in perspective showing a variant of the heliostat assembly of the invention.
Figure 5:
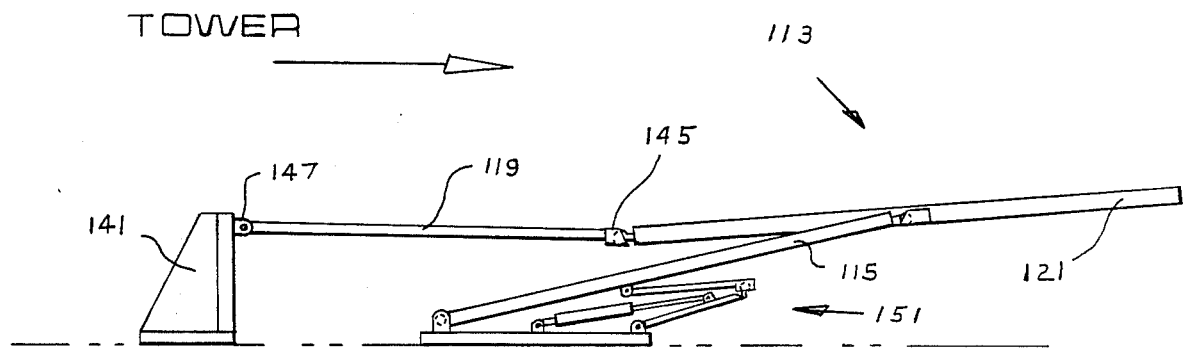
Figure 6:
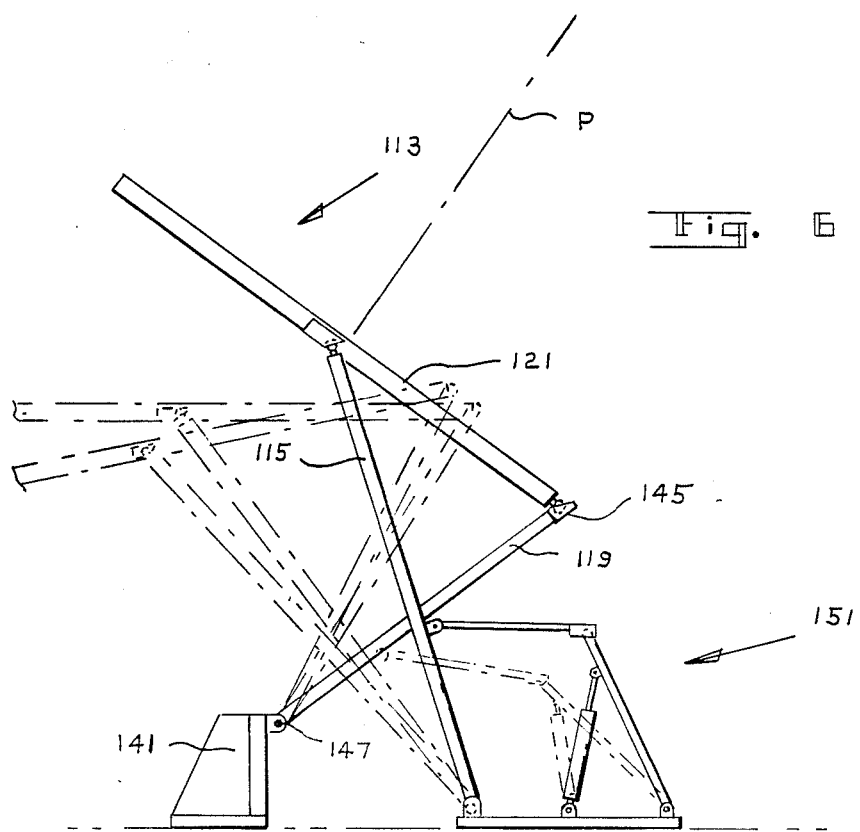
FIG. 6 is a side elevation view illustrating a tracking position of the assembly of FIG. 4.

FIGS. 4, 5 and 6 illustrate a second variant of the invention. This is a preferred embodiment which particularly lends itself to incorporation at any location in a field which surrounds the central tower. FIG. 4 shows heliostat 113 supported by first and second main levers 115 and 117 respectively, and by central arm 119. The upper ends of levers 115 and 117 are linked to support ring 123 by way of conventional ball-and-socket type joints indicated respectively by reference numerals 125 and 127. An upright support column 141 is located equidistantly from the lower ends of levers 115 and 117. One end of central arm 119 terminates in the socket portion of a ball-and-socket joint 145 on support ring 123, at a location equidistant from joints 125 and 127. The other end of arm 119 is pivotally attached to the top of post of 141 by a hinge-type joint for rotation about a horizontal axis through a pin 147, indicated in FIGS. 5 and 6.

To driver levers 115 and 117, hydraulic drive mechanisms 151 and 153, respectively, are provided. These mechanisms are equivalent to the aforedescribed drive mechanisms 51 and 53 shown in FIGS. 1 and 2, and are connected to a heliostat drive control system. FIG. 5 illustrates that a low profile stow position is attainable with this variant of the invention. Thus heliostat 113 may be held sufficiently close to the ground so as to significantly reduce wind load concerns. As with the first described embodiment it will be apparent to those of ordinary skill in the art that adjustments to the lengths of the main levers and the central arm, and to the relative locations of their ground attachments, may be made to achieve the desired angular travel of the heliostat. The embodiment shown in FIGS. 4, 5 and 6 is suited to application in a typical surround field since it can elevate up through 90 degrees (see phantom outline in FIG. 6) and, at an elevation as low as 52 degrees, the heliostat surface perpendicular P can be pointed around through 360 degrees continuously. It is preferred that at each location in a surround field, the heliostat 113 be oriented such that its stow position is generally pointed towards the tower as indicated by the arrow in FIG. 5.

An exception to this general convention is found in the south field heliostat that is located relatively close to the tower, in which case it is preferred that the stow position is pointed away from the tower.

The aforedescribed heliostat assemblies may also be driven by a cable system and particularly lends itself to an arrangement in which several heliostats are simultaneously driven by a single set of cables. Accordingly, FIG. 3 illustrates reflectors 79 and 80 carried in at least two heliostat assemblies 81 and 82 to which are attached the parallel drive cables 85 and 87, at locations 91 on the lever arms of the respective heliostat assemblies. First ends of cables 85 and 87 are connected to a drive mast 93 which has a cross member 95 that is pivotable about an axis through the generally upright post 97. The other ends of cables 85 and 87 are connected to the pivotable cross arm 101 of a follower mast 99 which has a generally upright post 103 which is pivotally mounted at its bottom end for movement about a horizontal axis therethrough. The lower end of the drive mast 93 is similarly mounted. In a modification of the invention rigid members may be substituted for the cables 85 and 87. An elevation cable 105, which has one end connected to a top part of mast 93, passes over driven pulley 107 and idler pulleys 108 and has its other end connected to the follower mast 99. Tension adjustment means, not shown, are connected to the pulleys 108. Thus the lever arms of heliostats 81 and 82 may be driven differentially when arm 95 of the driven mast is pivoted by the controlled action of the motor 106. The motor 111 may be driven to move the cable 105, in a controlled manner, to cause simultaneous pivoting of masts 93 and 99. This will move cables 85 and 87 in the same direction so as to change the elevation of reflectors 79 and 80. The appropriate extended movement of cables 85 and 87 in the same direction will bring the reflectors 79 and 80 to inverted stow positions. For greater responsiveness the cable connection locations 91 may be equipped with mechanisms for individually refining the orientation of reflectors 79 and 80. Such mechanisms are shown in U.S. Pat. No. 4,425,904.

The foregoing is considered as illustrative only of the principles of the invention. Further, since various modifications and changes may readily occur to those skilled in the arts without departing from the invention, it is not desired to limit the invention to the specific embodiment disclosed herein. Therefore it is aimed to cover all such changes and modifications as within the true spirit and scope of the invention as defined in the claims which follows.

What is claimed is:
1. Heliostat assembly, comprising:
   a. solar reflector;
   b. first lever and a second lever, the lower ends of said first and said second lever each mounted at horizontally spaced apart locations to a fixed support base by universal joint means, the upper ends of said first and second lever each mounted to the periphery of said reflector at horizontally spaced apart locations thereon by universal joint means;
   c. central arm having a first end which is mounted to the periphery of said reflector by universal joint means at a location which is equidistant from the mounting locations thereon of said first and second levers, and the second end of said central arm mounted by hinge joint means to a fixed support at a location equidistant from the lower ends of said first and second levers, said hinge joint means providing for rotation about a horizontal axis only; and
   d. drive means for pivoting said first and said second levers relatively in opposite directions by preselected amounts to provide azimuthal steering of said reflector, and for pivoting said levers relatively in the same direction to provide elevational steering of said reflector.

2. Apparatus as defined in claim 1 wherein said fixed support for said hinge joint means for said central arm holds said hinge joint means at an elevated location relative to the lower ends of said first and second levers.

3. Apparatus as defined in claim 1 wherein said pivoting of said first and second levers in opposite directions turns the reflector about an axis that passes through the mounting location on said reflector periphery of said central arm, and which bisects said reflector.

4. Apparatus as defined in claim 1 wherein the second end of said central arm is mounted at a location forward of said lever lower ends.

5. Apparatus as defined in claim 1 wherein the second end of said central arm is mounted at a location rearward of said lower ends.

6. Apparatus as defined in claim 1 wherein said first and second levers are pivotable relatively in opposite directions whereby the reflector is steered around an axis passing through the mounting location on said reflector periphery of said central arm, and said levers pivotable relatively in the same direction whereby the reflector is steered about an axis passing through the mounting locations of the upper ends of said first and second levers.

7. Apparatus as defined in claim 1 wherein said first and second levers are pivotable in the same direction whereby said reflector is rotatable to and from a horizontal inverted, face-down position.

8. Heliostat system comprising a plurality of heliostat assemblies, each as defined in claim 7, and wherein said drive means includes a first linkage means interconnecting the first levers of said assemblies, and second linkage means interconnecting the second levers of said assemblies, whereby said first levers and said second levers are respectively driven in unison.

9. System as defined in claim 8 wherein said first and second linkage means comprise rigid members.

10. Apparatus as defined in claim 1 wherein said reflector is circular.

11. Apparatus as defined in claim 10 wherein the upper ends of said first and second levers mount to said reflector periphery at diametrically opposite locations.

12. Apparatus according to claim 1 wherein said drive means includes a hydraulically powered actuator for said first and second arm respectively.

13. Apparatus as defined in claim 12 including conduit means for hydraulically linking said actuator for said first arm with said actuator for said second arm.

* * * * *